July 28, 1959
N. R. HUSSEY
2,896,413
PISTON ACTUATOR
Filed March 16, 1955
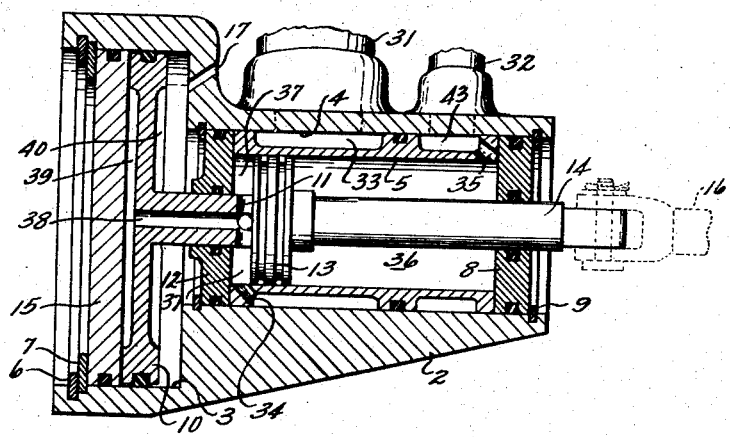
Fig 1
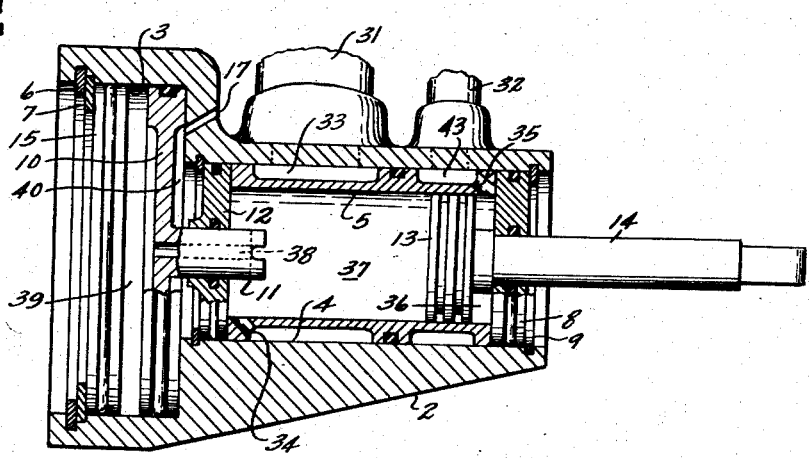
Fig 2
Fig 3
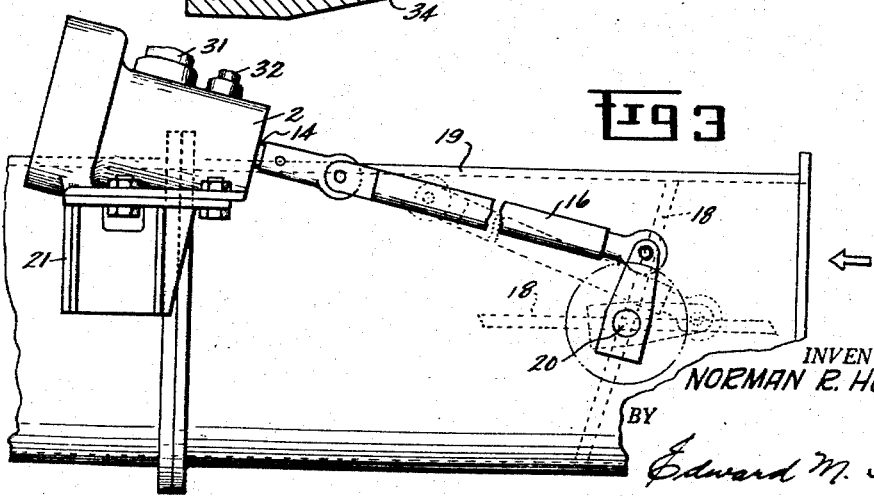
INVENTOR.
NORMAN R. HUSSEY
BY
Edward M. Tuttle
HIS ATTORNEY United States Patent Office 2,896,413
Patented July 28, 1959

2,896,413

PISTON ACTUATOR

Norman Russell Hussey, Amesbury, Mass., assignor to General Electric Company, a corporation of New York Application March 16, 1955, Serial No. 494,689

1 Claim. (Cl. 60—97)

This invention relates in general to piston actuators and relates more specifically to improvements in the construction of a fluid piston actuator for a fluid valve.

It is common commercial practice to provide a fluid actuator which comprises piston means arranged to be displaced by fluid pressure to control the opening and closing of a fluid valve. One of the principal problems encountered in providing actuators of this type to control fluid valves results from the fact that the force required to break the seal upon opening the valve is generally considerably greater than that necessary at any other portion of the opening or closing cycle. This relatively large force is commonly referred to as the "break-away" force and is caused by friction of the valve disk against the valve seat on opening. Another problem results from the fact that when the final closing force is too large, the valve may slam shut causing distortion of the parts and damage to the seals. Accordingly, an object of the present invention is to provide a fluid piston actuator which provides a large initial force for a limited stroke and a smaller force over the remainder of the stroke.

Another object of the invention is to provide a compact, light weight actuator for a fluid valve which provides the forces required to open a fluid valve using a limited amount of fluid.

Another object of the invention is to provide an actuator for a valve which provides a relatively large initial opening force, an intermediate magnitude of force over the major portion of the opening and closing cycles, and a relatively small final closing force.

Briefly, these and other objects are accomplished by providing a working piston which provides the principal opening and closing force and an auxiliary piston which provides a supplemental force during the initial part of the opening cycle and which also acts as a buffer during the final portion of the closing cycle.

The invention will be better understood from the following description taken in connection with the accompanying drawing in which:

Fig. 1 is a sectional view of an actuator constructed in accordance with the invention showing the actuator located at one end of its stroke;

Fig. 2 is a sectional view of the apparatus shown in Fig. 1 showing the actuator at the opposite limit of its stroke; and Fig. 3 is an elevation view of an actuator constructed in accordance with the invention mounted to control a fluid valve.

Referring to Figs. 1 and 2, the actuator comprises a casing 2 which may be cast or formed in any other desired manner to provide a relatively large cylindrical bore 3 and a smaller cylindrical bore 4 within which a sleeve insert 5 is mounted so as to be coaxially aligned with the bore 3. The bore 3 is closed at one end by a disk-shaped closure plate 15 which is held in place by a retainer 6 and washer 7. The smaller bore portion 4 is preferably closed by an annular closure plate 8 which is held in place by a snap ring retainer 9. A relatively large piston 10, called the "auxiliary piston" is slidably disposed within the bore 3. The auxiliary piston 10 is provided with a tubular piston rod 11 which fits slidably through a second annular closure plate 12 which separates the bores 3 and 4. The piston 10 in cooperation with the bore 4 and closure plates 12 and 15 forms two fluid chambers 39 and 40. A second and smaller or working piston 13 is slidably disposed within the tubular sleeve insert 5 and is mounted on a piston rod 14 which is fitted slidably through the annular closure plate 8. The working piston 13 in cooperation with the sleeve insert 5 and closure plates 8 and 12 forms two fluid chambers 36 and 37. Referring to Fig. 3, one end of the piston rod 14 is pivotably connected to a control linkage member 16 which in turn controls the position of a valve disk 18 which is rotatably mounted upon a shaft 20 which is mounted in suitable bearing means (not shown) fixed to opposite walls of a fluid conduit 19. The actuator casing 2 may be fastened to the conduit 19 by a bracket as shown at 21 in Fig. 3. The direction of fluid flow through the conduit 19 when the valve is open is indicated by the arrow in Fig. 3.

Operating fluid may be supplied to the actuator through fluid conduits 31 and 32. The conduit 31 communicates with an annular chamber 33 which is formed by the bore 4 and the annular sleeve 5. The conduit 32 communicates with a second annular chamber 43 which is formed by the bore 4 and the annular sleeve 5. A passage 34 provides fluid communication between the annular chamber 33 and the inside of the annular sleeve 5 at one end thereof. Another passage 35 provides fluid communication between the annular chamber 43 and the inside of the sleeve 5 at the other end thereof. A passage 38 in the piston rod 11 provides fluid communication between the inner portion of the sleeve 5 at one end thereof and the chamber 39. An opening 17 through the casing 2 vents the chamber 40 to atmosphere.

The arrangement described functions in the following manner. Assuming that the valve is closed, the parts will be in the positions shown in Fig. 1. To open the valve 18, pressurized operating fluid is supplied to the actuator through conduit 31, the conduit 32 being ported to a drain (not shown). Pressurized operating fluid entering through the conduit 31 fills the annular chamber 33 and flows through passages 34 and 38 to fill the chambers 37 and 39. The force of the fluid pressure in the chambers 37 and 39 acting against the pistons 13 and 10 urges them both to the right. As the pistons start to the right, the piston rod 14 acting through a linkage member 16 causes the valve 18 to move towards the open position. The force supplied by the pistons 10 and 13 during the initial part of the opening cycle is large in order to overcome the friction forces involved in breaking the valve seal. As the pistons 10 and 13 continue to move to the right, the piston 10 soon reaches the limit of its travel. The pistons are sized so that the force supplied by the fluid pressure in the chamber 37 acting on the working piston 13 is sufficient to continue opening the valve.

To close the valve, pressurized operating fluid is supplied through the conduit 32, and the conduit 31 is ported to a drain (not shown). Operating fluid entering through conduit 32 enters the annular chamber 43 and into the chamber 36 through the passage 35. The fluid pressure in the chamber 36 acting on the piston 13 creates a force urging the piston to the left. As the piston 13 moves to the left, fluid is exhausted from the chamber 37 through the passage 34, annular chamber 33, and conduit 31. When the valve is nearly closed the piston 13 contacts the piston rod 11 which is associated with the break-away piston 10. As the force created by the pressure in the chamber 36 causes the valve to close further, the piston 10 acts as a buffer or a dash pot to impede the velocity of closing at the very end of the closing cycle. Since the fluid in the chamber 39 is exhausted through the passages 38 and 34 to the annular chamber 33 before entering the conduit 31, a cushioning effect is provided which prevents the valve from slamming shut and sticking. It will be obvious to those skilled in the art that by proper design of the piston and passage sizes, any desired closing speed may be obtained.

While a particular embodiment of the invention has been illustrated and described, it will be obvious with those familiar with the art that various changes and modifications may be made without departing from the invention and it is intended to cover in the appended claim all such changes and modifications that come within the true spirit and scope of the invention.

What I claim as new and desire to secure by Letters Patent of the United States is:

A fluid actuator comprising a casing, a first bore and a second bore longer than said first bore within said casing, said bores being separated by an annular closure member, a first piston slidably disposed within said first bore and a second piston slidably disposed within said second bore, an extension on one of said pistons projecting slidably through an opening in said annular closure member and adapted to abut the adjacent surface of the other of said pistons, a first fluid port near the end of said second bore adjacent said first bore, a second fluid port near the end of said second bore remote from said first bore, and a fluid passage between the end of said first bore remote from said second bore and the end of said second bore adjacent said first bore.

References Cited in the file of this patent

UNITED STATES PATENTS

| | | |
|---|---|---|
| 747,772 | Rickman | Dec. 22, 1903 |
| 834,825 | Logan | Oct. 30, 1906 |
| 1,561,341 | Martin | Nov. 10, 1925 |
| 2,055,815 | Dewey | Sept. 29, 1936 |
| 2,148,616 | Gruber | Feb. 28, 1939 |

FOREIGN PATENTS

| | | |
|---|---|---|
| 978,988 | France | Dec. 6, 1950 |